United States Patent [19]

Brand et al.

[11] Patent Number: 5,237,566
[45] Date of Patent: Aug. 17, 1993

[54] NETWORK HUB FOR MAINTAINING NODE BANDWIDTH IN A SINGLE-NODE NETWORK

[75] Inventors: Robert C. Brand, Andover, Mass.; Stanford L. Mantiply, Palo Alto, Calif.

[73] Assignee: Ungermann-Bass, Inc., Santa Clara, Calif.

[21] Appl. No.: 331,217

[22] Filed: Mar. 30, 1989

[51] Int. Cl.[5] .................................. H04L 12/44
[52] U.S. Cl. .................................. 370/61; 370/94.3
[58] Field of Search .................. 370/85.1, 94.3, 61, 370/67, 85.13, 85.14, 91, 92, 85.4, 60.1, 85.3, 66, 68, 60; 379/88; 340/825.03, 825.52

[56] References Cited

U.S. PATENT DOCUMENTS

| | | | |
|---|---|---|---|
| 4,058,672 | 11/1977 | Crager et al. | 370/61 |
| 4,549,047 | 10/1985 | Brian et al. | 379/88 |
| 4,670,871 | 6/1987 | Vaidya | 370/60 |
| 4,700,344 | 10/1987 | Kaino et al. | 370/94.3 |
| 4,716,408 | 12/1987 | O'Connor et al. | 370/85.4 |
| 4,751,701 | 6/1988 | Roos et al. | 370/85.3 |
| 4,769,812 | 9/1988 | Shimizu | 370/67 |
| 4,771,420 | 9/1988 | Deschaine | 370/68 |
| 4,773,067 | 9/1988 | Duxbury et al. | 370/60.1 |
| 4,843,606 | 6/1989 | Bux et al. | 370/85.4 |
| 4,887,076 | 12/1989 | Kent et al. | 370/61 |
| 4,910,731 | 3/1990 | Sakurai et al. | 370/60 |
| 4,947,387 | 8/1990 | Knorpp et al. | 370/60 |

*Primary Examiner*—Douglas W. Olms
*Assistant Examiner*—Hassan Kizou
*Attorney, Agent, or Firm*—Townsend and Townsend Khourie and Crew

[57] ABSTRACT

A hub network system is provided for communication between nodes. The system can be used, e.g., when one node can be configured for baseband bus topology communication, such as LocalTalk TM communication. The node can communicate using the entire bandwidth of the medium, such as 230 Kbps bandwidth, even though other nodes are connected to the network using the hub card. Preferably, the hub card includes a multiprocessor system with a shared memory for providing high internal effective bandwidth communication, such as 15 Mbps communication. A proxy scheme is provided so that the hub topology is transparent to any node which can operate as though it were configured in a bus topology.

15 Claims, 6 Drawing Sheets

NETWORK HUB FOR MAINTAINING NODE BANDWIDTH IN A SINGLE-NODE NETWORK

The present invention relates to a hub-type data communications network and, in particular, to a network hub which maintains full media bandwidth for a plurality of nodes.

BACKGROUND INFORMATION

A multitude of devices and methods for data communication over a network system are known. Network systems can be characterized by a number of design aspects, each typically having particular advantages and disadvantages. One design aspect of a network system is known as the "network topology." Examples of topologies which are in use are a bus topology, a ring topology, and a star or hub topology. In a bus topology, a single linearly configured communications line is provided, and each data terminal or node connects to the line at some point along its length. In a ring topology, each node or data terminal communicates directly with two neighbors arranged in a topologically circular manner. In a star topology, a central unit or hub communicates to each node along dedicated lines.

Another aspect of network design involves the data transfer rate or bandwidth type of a communication system. The two basic bandwidth types are broadband systems and baseband systems. In a broadband system, several data terminals share a single communication medium through a frequency-division scheme. In a baseband configuration, the signals are unmodulated, and sharing of a medium requires time division between the nodes. In either system, when more than one data terminal is configured for transmission along a single medium at the same time, neither data terminal can have exclusive use of the medium over the entire theoretically available bandwidth for that medium. Thus, the effective bandwidth, i.e., the data transfer rate which actually results between two nodes, becomes reduced when multiple nodes or data terminals, each configured for communication, are connected to a single medium.

A particular network system typically is designed for particular types of network topology and bandwidth type. For this reason, it is normally not possible to provide a data terminal and associated software which is configured, for example, for a bus topology and, without modification, construct such terminals in a ring or star topology. Similarly, it is normally not possible to connect, without modification, a data terminal configured for baseband communication to a broadband network.

A number of network systems are susceptible to the above-noted problem, wherein addition of nodes to the system causes an effective decrease in the bandwidth for each node. One particular such network system is the LocalTalk TM (formerly known as "Appletalk ® Personal Network"). LocalTalk TM and Appletalk ® are trademarks of Apple Computers, Inc., Cupertino, Calif. The LocalTalk TM system is a baseband network that uses a bus topology. The LocalTalk TM system is described as having a maximum or upper-limit bandwidth in its present configuration. In present descriptions of this product, the maximum bandwidth or raw data rate is stated to be 230.4 kilobits per second (Kbps). Of course, it is possible that future versions of LocalTalk TM will have a higher maximum bandwidth. In the present system, a single node on such a network could communicate at about 230 Kbps, if no other nodes were using the system for communication. A system with multiple nodes, each of which is attempting to make communication over the medium, results in an effective bandwidth for each node which is less than 230 Kbps. The amount of reduction of bandwidth depends on the number of nodes added and the amount of network activity attempted by each node.

The LocalTalk TM network system includes a number of well-defined characteristics. Access to the bus is managed by a protocol known as "Carrier Sense Multiple Access With Collision Avoidance" (CSMA/CA). The LocalTalk TM system also includes protocols for assigning node identifiers, addressing particular nodes, assembling and appending data transmission signals, such as frames, error detection, and the like. Because of the specificity of such protocols, as well as the specificity of the associated hardware and software, it is not possible to connect a LocalTalk TM network or node to another type of network without extensive modification. A more complete description of LocalTalk TM is found in *Inside Appletalk*, by Gursharan S. Sidhu, Richard F. Andrews, and Alan B. Oppenheimer, Apple Computer, Jul. 14, 1986, incorporated herein by reference to the extent needed for understanding the invention.

Interfacing devices, generally known as "gateways," have been developed for connecting a LocalTalk TM network to another type of network. These gateways, however, do not solve the problem of decreasing bandwidth resulting from increasing nodes, and thus merely pass on this problem to another network.

In spite of these difficulties, the LocalTalk TM network remains a heavily implemented system, and many installations are in existence which are configured to use or to be connected to such a system. Additionally, many types of software have been written for the purpose of using a LocalTalk TM network.

Accordingly, it would be useful to provide a network system which can accommodate existing hardware and software intended for previous decreasing-bandwidth systems, but which solves the problem of decreasing-bandwidth, i.e., which permits each node to communicate over the medium at the full medium bandwidth.

SUMMARY OF THE INVENTION

The present invention includes using nodes or terminals which are configured for a bus topology baseband network system, such as a LocalTalk TM network system, and connecting such nodes or terminals in a star or hub topology. The hub is designed to emulate the bus topology in the sense that the nodes or terminals transmit and receive communications using substantially the same protocols as originally used, for example, LocalTalk TM protocols. However, because each node or data terminal is connected directly to the hub by a dedicated line, each node or terminal can employ the entire bandwidth available for that dedicated line. In the case of a LocalTalk TM node, this bandwidth is 230 Kbps.

The present invention achieves a point-to-point connectivity or a single node network. It is a network in the sense that one node can communicate with other nodes. However, the network is single-node in the sense that each node has substantially the same bandwidth capability it would have if it were the only node on the network.

One general method which might be used to achieve emulation of a bus topology without substantially degrading performance would be to provide a hub which performs the necessary processing at high rates of speed. Such a system would require both a fast processor and a fast memory; however, it would also be expected to be prohibitively difficult to build and maintain, as well as prohibitively expensive. Accordingly, in the preferred embodiment, the desired emulation is achieved while avoiding the use of extremely fast and expensive processors and memory.

The preferred embodiment involves a proxy system in which the hub sends and receives data emulating the original network protocols by formulating and using proxy messages. By using these proxy messages, the actual star topology is "transparent" to the nodes, which can continue to operate substantially as if they were connected to a bus topology, albeit at a full, e.g., 230 Kbps, bandwidth.

In addition to formulating and providing the proxy messages as needed, the hub also provides for very high speed data communication, such as for communication from one node to another node, or from one node to another network. The high speed communication, up to about 15-16 megabits per second (Mbps) or more is achieved by use of a shared memory system in which data received from one node can be stored in a memory location, and can be transmitted directly from that memory location to a destination without writing the data to a second memory location.

The hub has enough processing power to perform the above-described emulation and the above-described high speed communications with sufficient rapidity that communications to and from individual nodes is not impaired. In this way, the effective bandwidth for each node is the full bandwidth theoretically available for the medium to which the node is connected. The necessary processing power is provided, in the preferred embodiment, by a multiprocessor system. In the preferred system, four microprocessors are provided, each of which processes communications to and from four nodes, to provide a total capacity of 16 nodes. A fifth processor is provided to coordinate the hub operation. A shared memory is provided with each of the four node processors having read privileges throughout the shared memory, and exclusive write privileges in a portion of the shared memory.

DETAILED DESCRIPTION OF THE PREFERRED EMBODIMENTS

Figure 1:
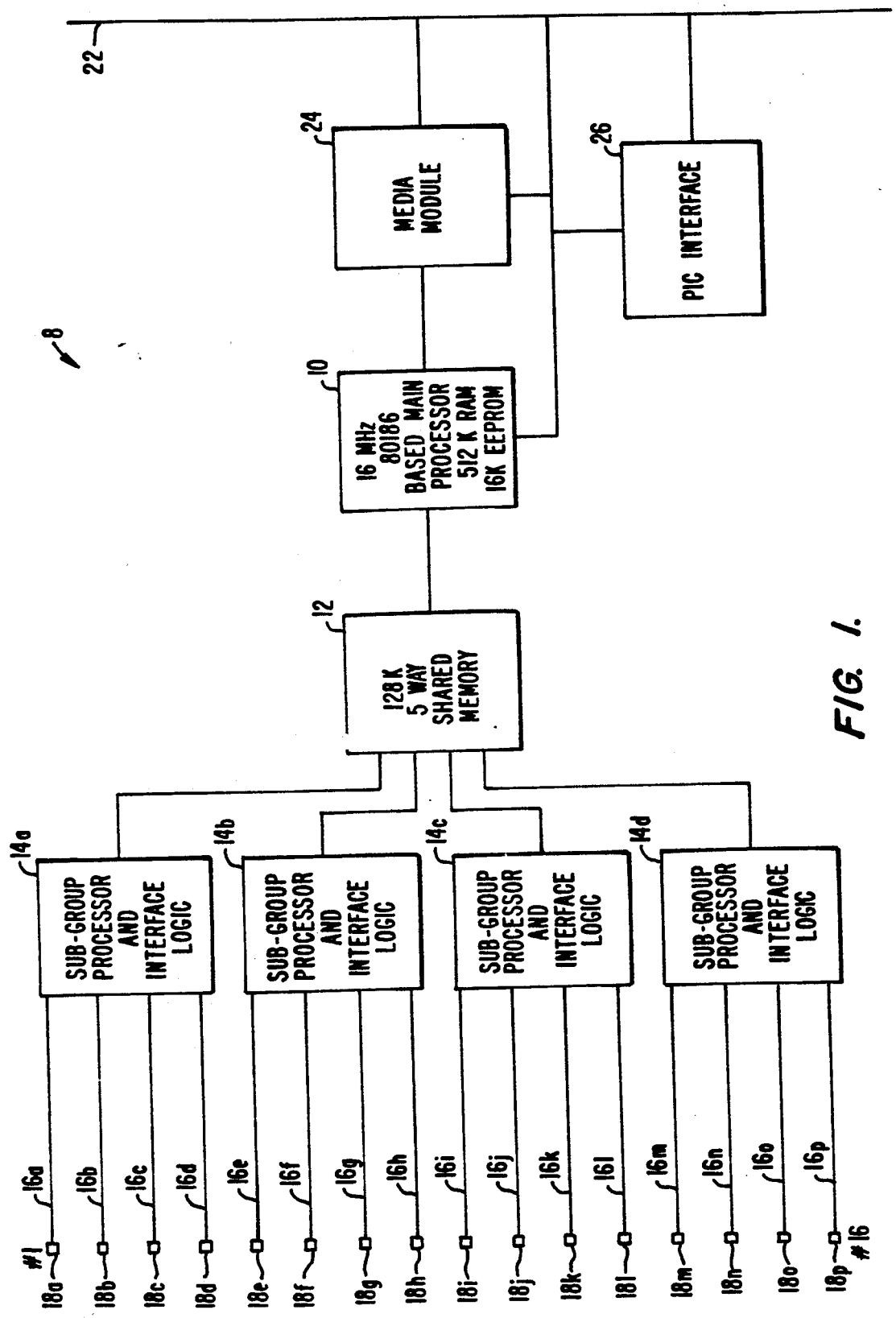
FIG. 1 is a schematic block diagram of the hub interface according to one embodiment of the present invention.

Referring to FIG. 1, a configuration for the hub 8 of the preferred embodiment is depicted. Preferably, the hub 8 is mountable on a single board, such as a 9"×14.5" board. Preferably, the board is compatible with existing network hardware and/or software, such as the Access/One ™ system produced by Ungermann, Bass, Inc., of Santa Clara, Calif. As depicted in FIG. 1, the hub 8 includes three major portions: a main processor unit 10; a shared memory unit 12; and four subgroup processors 14a, 14b, 14c, and 14d. Each of the subgroup processors 14a-14d is connectable to up to four nodes 18 using four communication lines or channels each 16a-16p. Preferably, the communication lines or channels 16a, 16b, 16c, 16d are single 22 or 24 AWg shielded or unshielded twisted pair wire, and can be about 300 meters in length, preferably up to about 330 meters in length. In addition to permitting communication among the nodes 18a-18p, the hub 8 is used to provide communication from one or more of the nodes 18a-18p to another network. Each node 18a-18p can include a single data terminal or can include a plurality of data terminals, e.g., serially interconnected in so-called "daisy chain" fashion. Communication to another network is through a connection, such as a bus connection, to the card's backplane (data) bus 22. Interface circuitry in the form of a media module 24 is provided to configure the communication for transmittal to another medium. The interface circuitry 24 can be provided for communication with another LocalTalk ™ network, an Ethernet ™ network, a token ring network, or other types of networks. Preferably, a processor interface controller (PIC) 26 is provided for purposes of system monitoring, error detection and correction, and similar functions.

In operation, when it is desired to establish communication between a first node, e.g., 18c, and a second node, e.g., 18i, the first node 18c initiates communication over its communication line 16c. The corresponding subgroup processor 14a routes the communication, which might be a protocol signal or frame, or a data signal or frame, to a portion of the shared memory unit 12 in which that subgroup processor 14a has permission to write. The main processor 10 can read the contents of the memory in the shared memory unit 12 and, using methods described more thoroughly below, can determine the destination of the communication which has been received. When the destination is the second node 18i, the main processor 10 can communicate to the appropriate subgroup processor 14c by writing a message in the shared memory unit 12, which can be read by the subgroup processor 14c, as described more fully below. The subgroup processor 14c then accesses the portion of the shared memory unit 12 where the communication from the first node 18c is stored, and routes this communication along the appropriate communication line 16i to the intended destination node 18i. When the intended destination node is other than one of the 16 nodes 18a-18p, which directly communicate with the hub, the main processor 10 configures the communication, as necessary, for transmittal to another medium, using the interface circuitry of the media module 24. The main processor 10 then routes the communication, properly configured and framed, as necessary, to the backplane (bus) 22 whence the message is ultimately transmitted to its destination.

Figure 2:
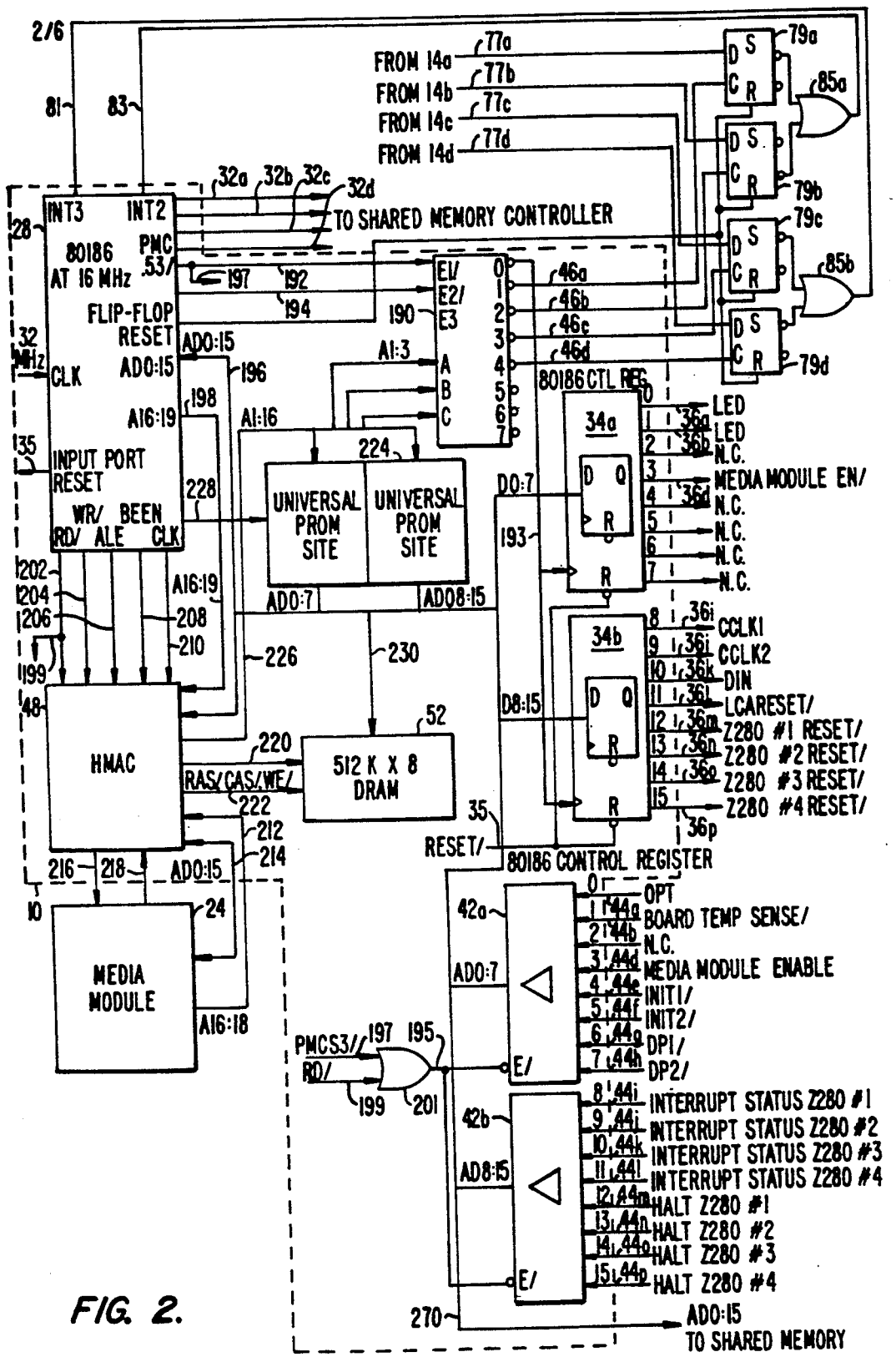
FIG. 2 is a block diagram of the main processor depicted in FIG. 1.

Referring now to FIG. 2, in the preferred embodiment, the main processor unit 10 includes a processor, such as an Intel 80186 CPU-based processor 28. As described below in connection with FIG. 3, the processor 28 can address an address space of 1 Mbyte. Of this, 640 k bytes are directly addressable by the main processor, distributed between a 512 k byte DRAM 52 and a 128 k byte shared memory unit 12 accessed through a four-way address bus 32a, 32b, 32c, 32d via a memory controller or arbitor 12b (FIG. 5) and through a data bus 270. An additional 128 k bytes of the address space is used for a 128 k programmable read only memory (PROM) 224. The communication to the shared memory unit 12 is the means by which the processor 28 communicates with the subgroup processors 14a-14d.

A 16-bit output port is provided on first and second output port chips 34a, 34b. A reset signal 35 from the processor 28, when asserted, places the output port chips 34a, 34b in a reset or start mode when the signal 35 is asserted and, when the signal 35 is deasserted, places the output port chips 34a, 34b in normal or operational mode. Bit 4 (signal line 36d) of the output port chip 34a is the enable bit for the media module 24. When bit 4 is asserted, typically after power-up, the media module 24 is in a reset mode. Deassertion of bit 4 takes the media module out of reset mode, whereupon it performs diagnostic self-tests, then begins normal operation. Bits 12-15 (signal lines 36m-36p) of the output port chip 34b are used for the reset for each of the subgroup processors 14a-14d, as described below. Bits 8-11 (signal lines 36i-36l) of the output port chip 34b are reserved for use with a high-speed option board. The high-speed option board (not shown) is an accessory which can be provided to allow the hub 8 to operate at an increased speed, such as 3-4 times normal LocalTalk TM speeds. Such a board will typically comprise logic cell arrays configured as reclocking circuitry. Bits 0 and 1 (signal lines 36a, 36b) of the output port chip 34a are used for LED (light-emitting diode) control.

A 16-bit input or status port is provided on first and second input port chips 42a, 42b. Status bit 0 (signal line 44a) of the input port chip 42a is read off the backplane bus 22 to provide an indication of the mode in which the backplane is operating (e.g., Ethernet TM mode, token ring mode, etc.). Status bit 3 (signal line 44d) of the input port chip 42a indicates whether the media module 24 is enabled, while status bits 12-15 (signal lines 44m-44p) of the input port chip 42b indicate the state of each subgroup processor halt line. Status bits 4-7 (signal lines 44e-44h) of the input port chip 42a are reserved for use with the high-speed option board, described above. Status bit 1 (signal line 44b) of the input port chip 42a is used in connection with board temperature sensing. Status bits 8-11 (signal lines 44i, 44j, 44k, 44l) of the input port chip 42b are used to identify which of the subgroup processors 14a-14d has interrupted the processor 28 after an interrupt signal is received. Each subgroup processor 14a-14d can send an interrupt signal to the main processor 28. Typically, such interrupts will not be needed for routine node-to-node messages, but are used when a subgroup processor 14a-14d needs to convey information to the main processor unit 10, such as upon occurrence of an error condition. Any of the subgroup processors 14a-14d (FIG. 1) requiring the attention of the main processor 28 can issue an interrupt request by performing a read operation to that processor's I/O address (OC0h). Such a read operation causes the I/O interrupt PAL 76 of the subgroup processor (FIG. 5) to issue a signal. For the first subgroup processor 14a, the signal is provided on line 77a (seen in FIGS. 5 and 2). Similar signals can be provided over lines 77b, 77c, and 77d (FIG. 2) from subgroup processors 14b, 14c, and 14d, respectively. Any of these signals 77a-77d sets a corresponding flip-flop 79a-79d, which triggers one of the microprocessor 28 interrupt lines 81, 83. The Model 80186 microprocessor, which, as noted above, is the microprocessor of the preferred embodiment, has only two interrupt lines available 81, 83. The first and second subgroup processors effect an interrupt on interrupt line number two (INT2) 81 of processor 28 via an OR gate 85a. The third and fourth subgroup processors 14b, 14c effect an interrupt on interrupt line number three (INT3) 83 of the processor 28 via an OR gate 85b. The processor 28, in the interrupt handling routine, then reads the status ports 44i, 44j, 44k, 44l to determine which subgroup processor 14a-14d caused the interrupt. The processor 28 resets the interrupt flip-flops by performing an I/O write to one of the four I/O ports 46a-46d. The first, second, third, and fourth ports 46a, 46b, 46c, 46d are used to effect flip-flop resets after interrupts originating from the first, second, third, and fourth subgroup processors 14a, 14b, 14c, 14d, respectively.

Access to the I/O ports 46a-46d is via a 3-to-8 decoder 190, controlled by an I/O chip-select line 192 and a write line 194. The 3-to-8 decoder 190 can send chip-enable signals to the output port chips 34a, 34b over a chip-enable line 193. The I/O chip-select signal 192 is also used for control of the input registers 42a, 42b. In this case, the output port chip-select signal 195 results from the OR-ing of the I/O chip-select signal 197 with the read signal 199 from the main processor 28. The full physical lines for the I/O chip-select signal 197 and read signal 199 between the processor 28 and the OR gate 201 are not shown.

The main processor 28 accesses the 512 k bytes of DRAM 52 via a high-speed memory access controller (HMAC) 48. The HMAC 48 also conducts the refresh, parity generation, checking, and test functions for the DRAM 52. The processor 28 communicates with the HMAC 48 over two bus lines 196 and 198, under control of four signal lines 202, 204, 206, 208, and a clock signal 210. The first bus 196 is a dual function bus which acts either as an address bus for bits 0-15 or a data bus for bits 0-15. The second bus 198 acts as an address bus only for bits 16-19. The read enable 202 and write enable 204 lines control the timing of reads and writes to the 512 k DRAM 52. The address latch enable line 206 controls the timing of memory addressing. The byte-high enable line 208, when energized, indicates that a write operation is to be performed on the high byte (bits 8-15) of a memory location. The byte high enable 208 is a feature of the 80186 processor which, as noted above, is the preferred model for the processor 28. The 16 MHz clock signal 210 is used for general timing purposes. The HMAC 48, in turn, communicates with the media module 24 over an address bus 212 and data/address bus 214, controlled by a bus grant signal 216 and bus request signal 218. The HMAC 48 communicates with the DRAM 52 using a DRAM address bus 220 and a DRAM Row Address Strobe (RAS), Column Address Strobe (CAS), and Write Enable (WE) control line 222.

The HMAC 48 also provides the processor 28 access to the PROM 224, using latched address bus 226. The PROM 224, controlled using a PROM chip select line 228, contains boot memory The PROM 224 communicates with the 512 k DRAM 52 via a data bus line 230.

Because there are five processors 10, 14a, 14b, 14c, 14d which must have access to the shared memory unit 12, specific hardware, including a memory-control programmable array logic (PAL) 92 residing in each of the subgroup processors 14a, 14b, 14c, 14d (FIG. 5), is provided to control access of these processors to the shared memory unit 12. In the preferred embodiment, the access is by a so-called "round-robin scheme," in which the main processor unit 10 and each of the subgroup processors 14a, 14b, 14c, 14d are provided access for a predetermined amount of time in a sequential repeating fashion. A number of "round-robin" schemes are possible. In one preferred embodiment, access is divided among 16 recurring, sequential time slots. All even time slots (0, 2, 4, 6, 8, 10, 12, 14) are allocated for access by the main processor 28. Time slots 1 and 9 are allocated for access by the first subgroup processor 14a. Time slots 3 and 11 are allocated for access by the second subgroup processor 14b. Time slots 5 and 13 are allocated for access by the third subgroup processor 14c. Time slots 7 and 15 are allocated for access by the fourth subgroup processor 14d. The duration of the time slots varies according to the amount of contention for memory. When there is no contention, the main processor 28 will complete access in 0-wait state time, and the subgroup processors 14a, 14b, 14c, 14d will complete access in 1-wait state time. As contention increases, wait states are added to both the main processor times slots and the subgroup processor time slots.

Figure 3:
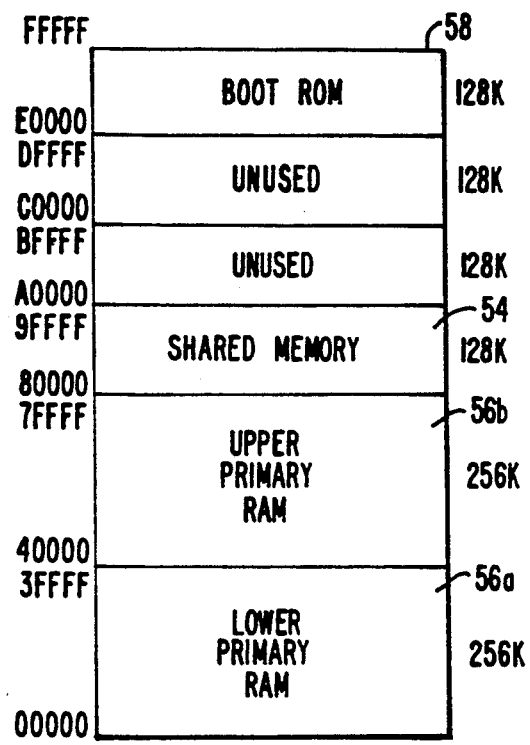
FIG. 3 is a memory map for the main processor memory.

Referring now to FIG. 3, the distribution of the memory address space which is addressable by the processor 28, is shown. That portion 54 of the address space between addresses 80000 and 9FFFF is reserved for addressing the shared memory unit 12, described more fully below. The media module 24 will not have direct access to the shared memory address space 54. The lower portions 56a, 56b (addresses 00000–7FFFF) of the address space represent memory which is used by the main processor 28 in its normal operations, and is memory space which is shared with the media module 24. The upper memory (E0000-FFFFF) 58 portion of the address space is used to address the PROM 224, which is used for booting the processor 28.

Figure 4A:
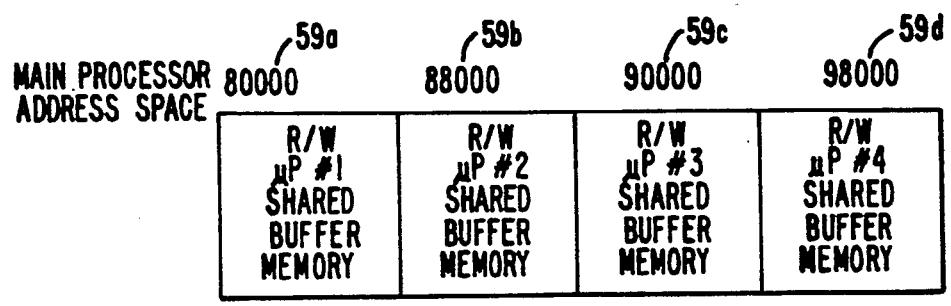
FIG. 4A and 4B is a memory map for the memory shared by the subgroup node processors.
Figure 4B:
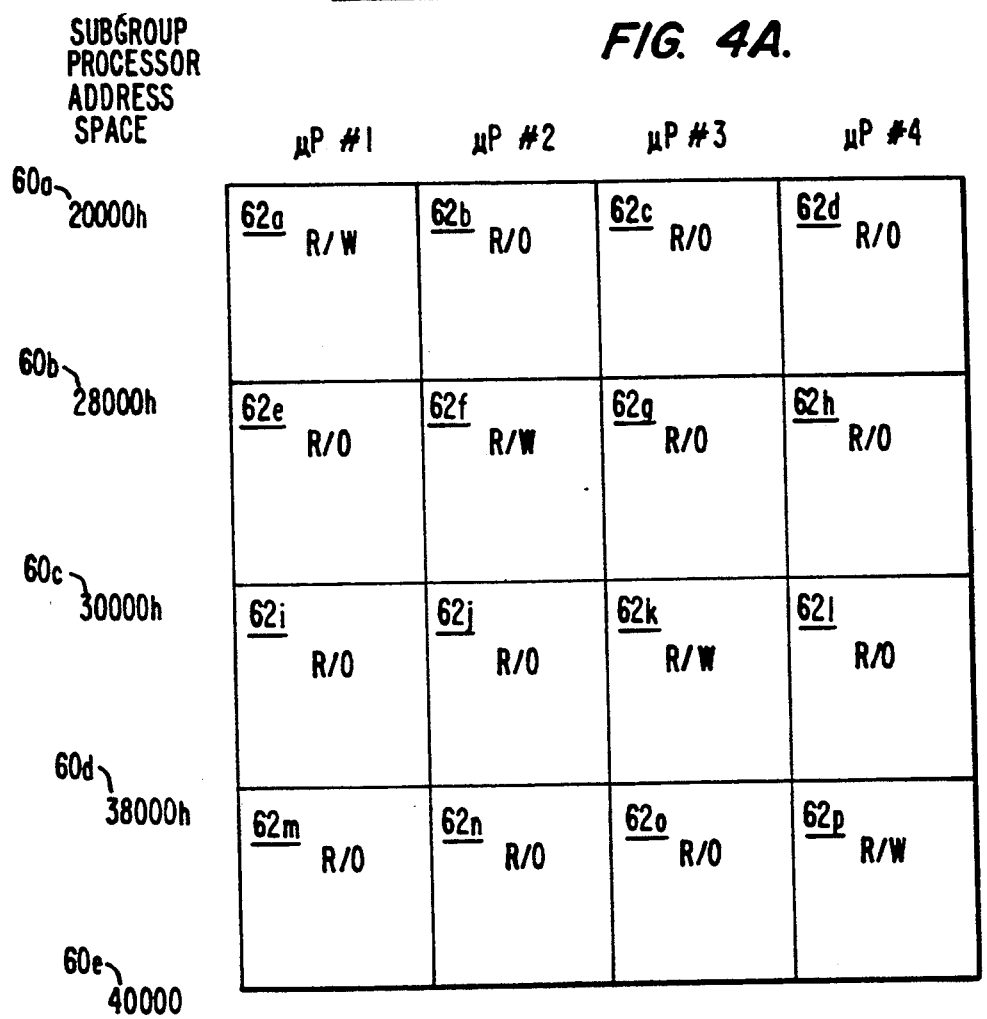

Referring now to FIG. 4A, a map of the address space 54, which is used by the main processor unit 10 to address the shared memory unit 12, is depicted. FIG. 4B is a table of the address space used by the subgroup processors 14a–14d to address the same memory locations. Although the memory locations depicted in FIGS. 4A and 4B are the same, the addresses used by the main processor 28 (FIG. 4A) differ from the addresses for the same memory locations which are used by the subgroup processors 14a, 14b, 14c, 14d (FIG. 4B). The addresses 59a, 59b, 59c, 59d, marking boundaries within the shared memory address space 54 used by the main processor unit 10, are indicated across the top of FIG. 4A. The addresses 60a, 60b, 60c, 60d, 60e, marking boundaries within the shared memory address space 54 used by the subgroup processors 14a, 14b, 14c, 14d, are indicated along the left side of FIG. 4B. The columns of FIG. 4B indicate, for each subgroup processor 14a–14d, whether that processor has read only (R/O) access to the block of memory depicted in that row, or has read and write access (R/W) to the block of memory depicted in that row. As seen in FIG. 4B, the shared memory address space is configured so that each of the subgroup processors 14 has read capability or permission in the entire shared memory unit 12. However, each of the subgroup processors 14a–14d has permission to write, to the exclusion of the other subgroup processors, only in certain predefined portions of the shared memory unit 12. For example, the first subgroup processor 14a can read from any of the shared memory blocks, as seen from the designations in the first column 62a, 62e, 62i, 62m. However, the first subgroup processor 14a can write only in the first 32 k memory block 62a of the shared memory unit 12. None of the other subgroup processors 14b–14d can write in this block, as shown by the R/O designations in the remaining columns 62b, 62c, 62d of the first row. Similarly, the second subgroup processor 14b can read from any of the shared memory locations, as seen from the designations in the second column 62b, 62f, 62j, 62n, but can write in only one of the 32k blocks of shared memory 62f. None of the other subgroup processors 14a, 14c–14d can write in this block of memory, as shown by the R/O designation in the remaining columns 62e, 62g, 62h of the second row.

A number of schemes can be used to alert one of the subgroup processors 14a–14d that there is a message in memory which that subgroup 14a–14d should access. According to one scheme, each subgroup processor 14a–14d is assigned a portion of the shared memory unit 12 as a "pointer" area. When a message is written anywhere in the shared memory unit 12 which a particular subgroup processor 14a–14d should access, a pointer is written to the pointer area for that subgroup processor. The pointer can be, e.g., the starting address for the memory location where the message is stored. As each subgroup processor gains access to the shared memory unit 12, it scans the pointer area which has been assigned to it and, if any pointer has been written therein, can read from the memory location indicated by that pointer.

The resulting shared memory scheme provides for a sharing of the memory among the main processor 10 and the four subgroup processors 14a–14d. Each subgroup processor, in turn, communicates with four nodes to provide for communication with a total of 16 nodes 18a–18p. Other processor/shared memory configurations are possible. The processing could be conducted by a single high speed processor, rather than a multiprocessor system, although, with present technologies, a microprocessor with the processing power necessary to avoid degradation of the communication bandwidth, is more expensive than the disclosed multi-processor environment. A separate processor could be provided for each of the 16 nodes. However, it has been found that the resultant 16-way shared memory would be too slow to provide for the desired communication without detrimental effect on the effective bandwidth of the communication.

Figure 5:
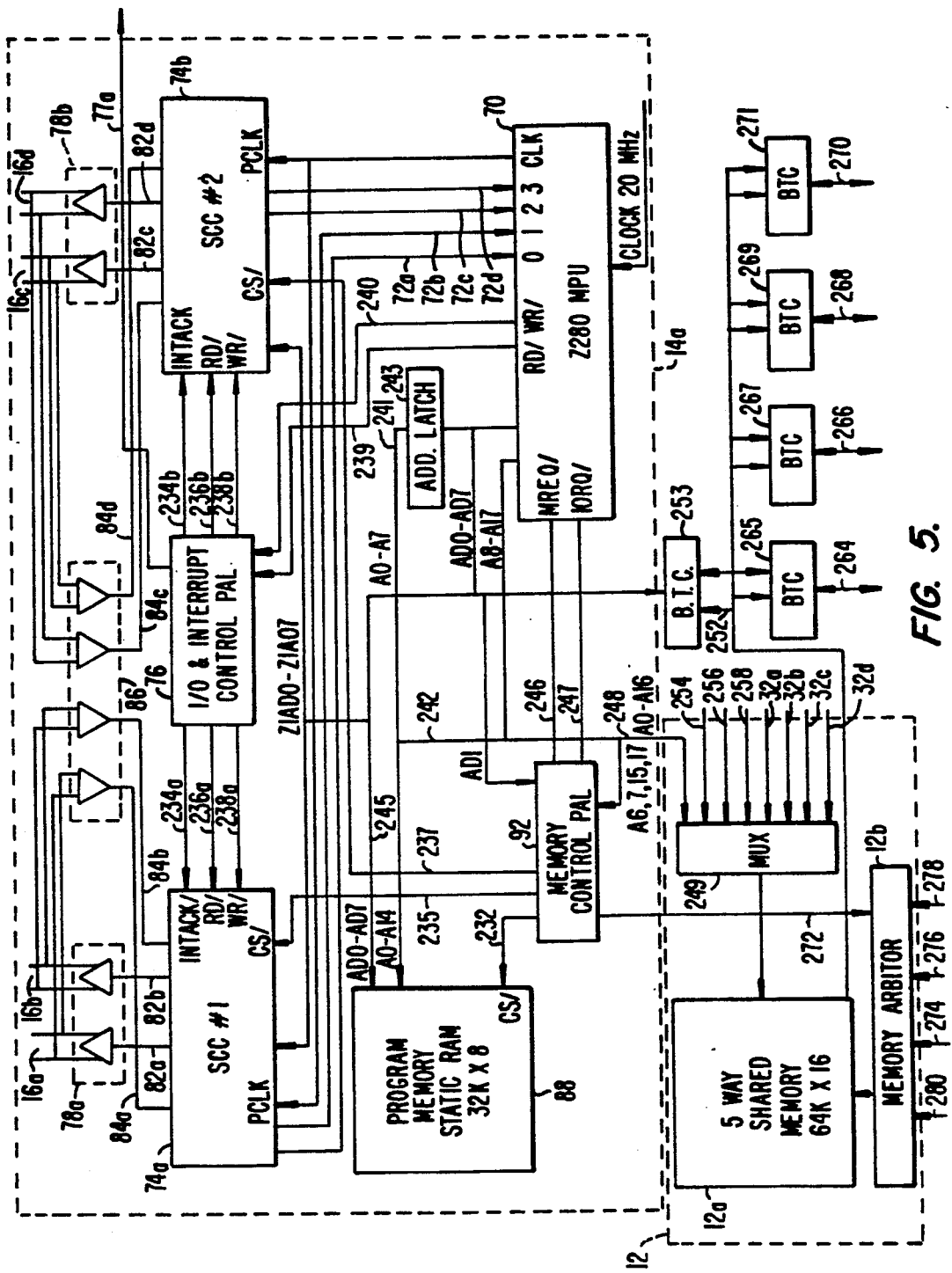
FIG. 5 is a block diagram of a single one of the subgroup processors depicted in FIG. 1.

Referring now to FIG. 5, the first subgroup processor 14a is schematically depicted. The remaining subgroup processors 14b–14d are identically designed. Thus, the discussion and description of the subgroup processor 14a will be understood as being applicable to the subgroup processing 14b–14d. The subgroup processor 14a includes a microprocessing unit (MPU) 70, which, in a preferred embodiment, is a Model Z280 microprocessor produced by Zilog, Inc., Campbell, Calif. The MPU 70 contains no permanent storage device, such as EPROM's. Thus, all program instructions for the subgroup processors 14 are uploaded through the shared memory. The main processor unit 10 will control the start-up of each subgroup processor 14a-14d, including the loading of program instructions when the hub inerface 8 is first powered-up, or when one or more of the subgroup processors 14a, 14b, 14c, 14d must be reset (such as following an unrecoverable error). The loading of program instructions is controlled by the reset bits 12-15 (signal lines 36m-36p) from the I/O port 34 (FIG. 2) of the main processor 28. Each of the four reset bits 12-15 (signal lines 36m-36p) corresponds to one of the four subgroup processors 14a, 14b, 14c, 14d. The bit corresponding to the subgroup processor which is to have its program instructions loaded is set to 0. This causes the corresponding subgroup processor to enter a reset or start state. The code (i.e., program instructions) appropriate for the particular processor either already resides in the shared memory unit 12 or is deposited into the shared memory unit 12. The corresponding bit 12-15 (signal lines 36m-36p) is then set to a 1 after a minimum wait period of 12.8 microseconds. The subgroup processor will then leave the reset state and begin to execute code out of the shared memory unit 12.

Four data channels 72a, 72b, 72c, 72d couple the MPU 70 to two serial communication chips (SCC) 74a, 74b. The SCCs 74 are preferably produced by Zilog, Inc., and sold under the part number identification, Model 85C30. The MPU 70 also communicates with an I/O and interrupt control programmable array logic (PAL) 76. The SCCs 74 and PAL 76 cooperate to provide the MPU 70 with communication to and from four communication lines or channels 16a, 16b, 16c, 16d. The communication ports 16a, 16b, 16c, 16d are controlled by I/O ports 78a, 78b. The I/O ports 78a, 78b are controlled by cooperation between the SCCs 74a, 74b and the PAL 76. The PAL 76 controls the SCC's using interrupt acknowledge lines 234a, 234b, I/O read signal lines 236a, 236b, and write signal lines 238a, 238b. The interrupt acknowledge lines 234a, 234b are used by the SCC's 74a, 74b to issue an interrupt signal to the MPU 70, e.g., when there is an incoming message, and is used by the MPU 70 (via the I/O and interrupt control PAL 76) to acknowledge the interrupt request. The I/O read and write signal lines 236a, 236b, 238a, 238b control the timing of read and write access to the SCC's 74a, 74b, as determined by read and write signals 239, 240 from the MPU 70, in coordination with the chip select lines 235, 237. Each SCC provides, with respect to each of the two controlled lines 16, a data channel 82a, 82b, 82c, 82d, which connects directly to the I/O port 78a, 78b, and a control/status channel 84a, 84b, 84c, 84d, which communicates to an interface chip 86. Since there are only four direct memory access (DMA) channels 72a, 72b, 72c, 72d on the microprocessor 70, and there are four serial ports 16a, 16b, 16c, 16d to service, it is necessary to share the channels 72a, 72b, 72c, 72d between receive and transmit sides of the SCCs. This method of using the communication channels is acceptable, for a system such as LocalTalk TM, which is a half-duplex system, because there is sufficient time between packets to switch the use between receive and transmit.

The MPU 70 communicates to two different memories. It is in communication with its own program memory 88, which is in the form of a static RAM, and is also in communication with the shared memory unit 12, controlled through a memory control PAL 92. Communication with the program memory 88 is via an address bus 242 and a data bus 245. The MPU 70 communicates directly with the memory control PAL 92 via a memory request signal 246 and an I/O request signal 247. The memory request signal 246 causes the memory control PAL 92 to issue the appropriate memory chip select signal on line 272, as described below. The I/O request signal 247 causes the memory control PAL 92 to issue the appropriate SCC chip select signals 235, 237, as described above. The MPU 70 communicates with the program memory 88 over a bus 241 via an address latch 243. The memory control PAL 92 of each subgroup processor 14a-14d can be used to partition and protect certain areas of the shared memory unit 12.

The shared memory unit 12 (FIG. 5) includes a memory chip 12a, a memory arbitor 12b and a multiplexer 249. The memory chip 12a receives communications from the first subgroup processor 14a via address and data busses 248, 252, passing through a multiplexer 249 and bidirectional translation chip (BTC) 253, respectively. The address busses 254, 256, 258 provide address communication between the second, third, and fourth subgroup processor 14b, 14c, 14d, and the shared memory unit 12 via the multiplexer 24a. Address lines 32a, 32b, 32c, 32d (also seen in FIG. 2) provide address communication between the main processor unit 10 and the shared memory unit 12. Data busses 264, 266, 268 provide data communication between the second, third, and fourth subgroup processor 14b, 14c, 14d, and the shared memory passing through BTC's 265, 267, 269, respectively. Data bus 270 (also seen in FIG. 2) provides data communication between the main processor unit 10 and the shared memory unit 12, passing through a BTC 271. Control of the shared memory unit 12 is achieved using chip select signals 272, 274, 276, 278 from the subgroup processor 14a, 14b, 14c, 14d, and a chip select signal 280 from the main processor unit 10.

The PAL 92 can initiate chip select directed to the program memory 88, via line 232, and to the first and second SCC's 74a, 74b via lines 235, 237. Although, for purposes of discussion, the I/O PAL 76 and memory control PAL 92 are referred to and illustrated as separate entities, in the preferred embodiment, there is a single PAL which is programmed to perform both operations.

In operation, when a first node, e.g., 18c, attempts communication with a second node, e.g., 18i, the node transmits and receives the proper protocol preparatory to such transmission, described more fully below. After the protocol procedure, transmission of the data, which has been framed as described more fully below, is initiated along data line 16c, and routed by the processor 70, using the memory controller 92 directly to the shared memory unit 12. The main processor 10 provides the proper protocol, described more fully below, to configure the destination node 18i to receive the transmission. This communication to and from node 18i is achieved by the main processor 10 writing the proper messages into the shared memory unit 12, and instructing the appropriate subgroup processor 14c to transmit these messages the destination node 18i along the proper communication line 16i. Once the destination node 18i is configured to receive the data, the main processor 10, using the shared memory unit 12, provides instructions to the proper subgroup processor 14c to begin the communication. The subgroup processor 14c conducts the communication, using memory control unit 92 to route the data, with proper framing and other protocol, described more fully below, directly from the shared memory unit 12 to the proper communication line 16i. In this way, the data which is sent from the first node 18c to the second node 18i is stored and properly configured, but rewriting to a second memory location is not needed. The shared memory unit 12 provides for a speed of communication which is equivalent to a high bandwidth, at least about 15 Mbps, preferably at least about 16 Mbps, so that this stage in the communication does not significantly reduce the effective communication bandwidth for any node. Because each node 18a-18p communicates over a dedicated line 16a-16p, without other traffic being on that line, each node 18a-18p can communicate using the full bandwidth for that line. For the LocalTalk TM configuration, this bandwidth is about 230 Kbps.

A communication from a first node 18c to another network is accomplished similarly, except that the data in the shared memory unit 12, instead of being read from shared memory onto one of the communications lines 16a-16p, is configured by the media interface module 24 and transmitted over the hub card backplane 22 to another network. The other network can be another LocalTalk TM network, such as one controlled by a second hub card, or can be another type of network, such as an Ethernet TM or a token ring network.

Having described the hub configuration, the protocol and proxy systems by which communication with a LocalTalk TM -44 configured node is achieved will be described next.

In order to best describe the operation of the present invention, it is useful to first describe, in general terms, the manner in which nodes communicate on a typical LocalTalk TM network system. The description of LocalTalk TM network communication is not intended to be comprehensive or detailed in every respect, but is provided merely to assist in the understanding of the description of the present invention which will follow. Further details can be found in *Inside Appletalk*, by Gursharan S. Sidhu, Richard F. Andrews, and Alan B. Oppenheimer, Apple Computer, Jul. 14, 1986.

Aspects of LocalTalk TM communication which are of particular importance include address allocation, line acquisition by a node and request-to-send (RTS), clear-to-send (CTS), and data transfer protocols and timing.

Figure 6:
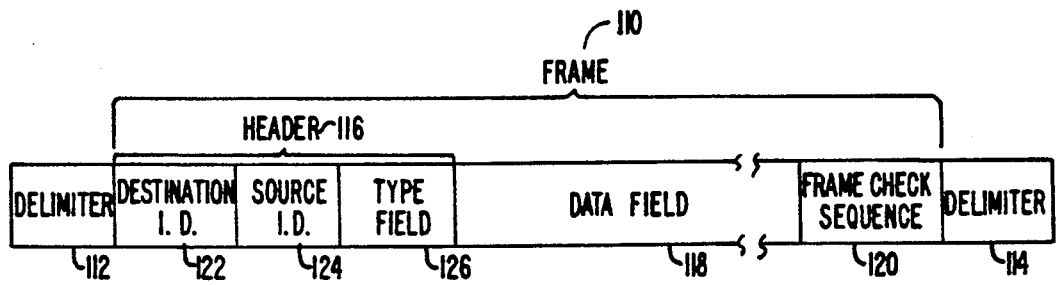
FIG. 6 is a schematic diagram of a delimited frame according to an AppleTalk ® Link Access Protocol.

FIG. 6 shows a typical frame format used in the AppleTalk ® (now called "LocalTalk" TM )link access protocol (ALAP). The frame 110 is preceded and followed by frame delimiters 112, 114. The frame 110 includes three portions: a header 116; a data field 118; and a frame check sequence 120, used for error correction and detection. The data field 118 can be 0-600 bytes in length. The header 116 contains three one-byte fields. The first field 122 contains the destination node identification, and the second byte 124 contains the source node identification. Each of these two node identifications or addresses is a number between 0 and 255. A destination node identification of 255 indicates a broadcast, i.e., frames containing a destination node identification of 255 are accepted by all nodes. A destination node of 0 is treated as "unknown." The third field in the header 116 is the type field 126. Type fields in the range of 1-127 are used to indicate that the frame is intended to transmit data, and the value of the type field specifies a protocol type for use by the destination node in receiving and interpreting the data. Type fields 126 which have a value in the range of 128-255 are used for control frames. Control frames do not contain a data field 118. Four control frames are of importance to the present discussion: the "ENQ" or "enquiry" control frame; the "ACK" or "acknowledgement" control frame; the "RTS" or "request-to-send" control frame; and the "CTS" or "clear-to-send" control frame.

When a node is initially added to or incorporated into a LocalTalk TM network (including each time an inactive node is activated), it is necessary for the node to have a node identification associated with it. In the LocalTalk TM system, a dynamic node assignment method is used. In general terms, a newly activated node "guesses" its own node identification, and determines whether the guess was incorrect, in the sense that another node is already using that identification. Specifically, a newly activated node extracts a node identification number, either form a long-term memory of its own or by generating a random number in the proper range of allowable node identification numbers. The node then sends a control frame (ENQ) to the node which was guessed. If the node identification which was guessed is in use, the node using that node identification will send an ACK control frame. Thus, if the newly activated node, after sending the ENQ frame (typically several times), does not receive an ACK, it will continue using the guessed node identification. If an ACK is received, the newly activated node will attempt to guess another node identification using the same procedure. The process is repeated until the newly activated node has guessed a number for which no ACK frame is sent. Note that under the existing LocalTalk TM methods, there is no central repository for storing node addresses. Each node knows its own address, but there is no central table for storing all node addresses.

Once a newly activated node has acquired its own identification, it can attempt a communication. As noted above, in previous LocalTalk TM networks, there is a single bus line which is used by a number of nodes. Accordingly, each node must refrain from using the bus until there is a high probability that use will not interfere with communications already being transmitted on that bus. This aspect is known as "line acquisition." Second, the node must determine whether the destination node for the data is active and ready to receive the data.

The line acquisition technique is a type of collision avoidance method. According to this technique, all nodes which are active are continuously sensing the bus, and thus, at any one time, each node can determine whether the bus is presently being used. No node can begin transmitting until at least a minimum "inter-dialogue gap" has occurred, during which time no communication has been sensed on the bus. It will be apparent that if each node awaits precisely the same inter-dialogue gap, following such a gap there is a probability that several nodes may attempt to communicate over the bus simultaneously. Accordingly, each node also waits an additional randomly generated time interval, the time interval being different for each node, before transmission of data can begin. This technique avoids data collisions. The randomly generated time interval, which is added to the inter-dialogue gap by each node, is adjusted, in LocalTalk TM, according to the perceived bus traffic. Thus, during a time in which the bus traffic is less (compared to periods of heavier use), the time any individual node must wait before transmitting is also less.

Figure 7:
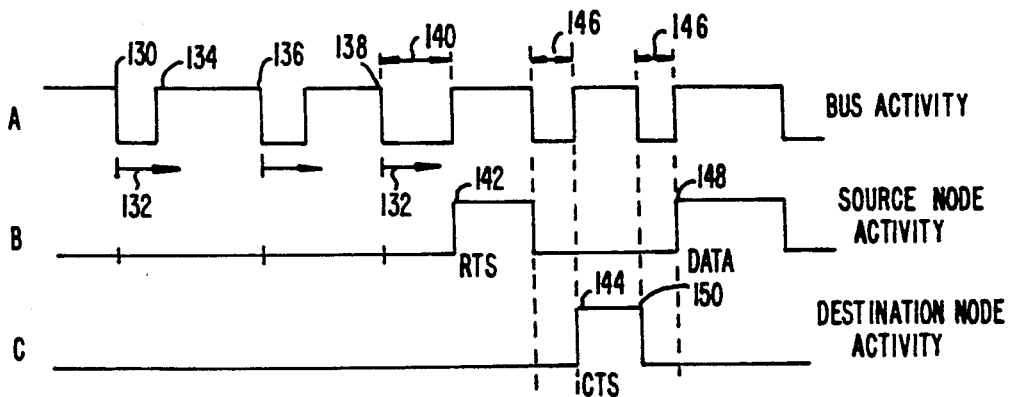
FIG. 7 schematically illustrates the relative timing of bus, source node, and destination node activity during acquisition and RTS-CTS protocol according to a previous networking scheme.

Referring to FIG. 7, the RTS-CTS protocol is depicted. FIG. 7A indicates bu activity over a period of time. FIG. 7B indicates the activity of a source node which is waiting to send data. FIG. 7C depicts the activity of a destination node. At time 130, the bus activity ceases, and the source node begins timing the interval of non-activity of the bus to determine whether the bus is active for the required time of the inter-dialogue gap (typically, 400 microseconds), plus the randomly-generated time interval 132. As depicted in FIG. 7, when the bus becomes active at a time 134 before the expiration of the required interval 132, the source node defers, i.e., does not begin transmitting. Such deferral may occur several times 136. Beginning at time 138, the bus is inactive for a period 140, which is equal to the necessary wait interval 132 for the source node. At this point, the source node initiates transmission 142 of a control frame 110, which is of the RTS type. In this frame, the destination identification 122 corresponds to that of the destination node, and the source identification 124 corresponds to the that of the source node. The type field 126 is of type RTS. The data field 118 is absent. If the destination node is active and in condition to receive data, it will, upon receipt of the RTS frame, transmit 144 a control frame of the CTS type, as shown in FIG. 7C. For the source node to recognize this transmission of a CTS frame, the initiation 144 of the CTS frame must begin within a predetermined inter-frame gap 146 (typically, about 200 microseconds) after the RTS frame has been transmitted. The CTS frame 144 is constructed such that its destination field 122 contains the identification of the source node. This enables the source node to receive the CTS frame. Upon receiving this frame, the source node must, within the time interval of the inter-frame gap 146, begin transmission of the data frame 148.

Several items in this scheme of operation are of note. First, the CTS frame is produced and sent by the destination node. It is sent in response to the RTS frame, and thus the source node cannot begin receiving a proper CTS until the destination node has begun transmitting a CTS. Further, initiation of the data transmission 148 must follow completion 150 of the CTS signal, which is sent by the destination node.

Because the present invention involves a single node network, the RTS/CTS protocol, described above, will not be operable without some modification. This is because, in the single-node network, there is no single bus which carries all of the communication and to which all nodes listen.

In order to achieve the advantage of giving each node exclusive use of its own communication line, the hub circuitry in the present invention has the capability of determining which node is the destination node for a communication, and routing the communication only to that destination node, along its own dedicated line.

By reference to FIG. 7, it can be seen that one possibility is to provide hub circuitry which is sufficiently fast that it can perform the necessary routing in a period less than the interframe gap 146. If the hub circuitry requires more than this amount of time, the destination node will not be able to respond with the CTS signal within the interframe gap, and the source node will not recognize the validity of a CTS frame which lags by more than the interframe gap. Hub circuitry which performs the necessary processing quickly enough to achieve such timing is expensive and difficult to design and maintain. Accordingly, the preferred embodiment employs a proxy technique.

Figure 8:
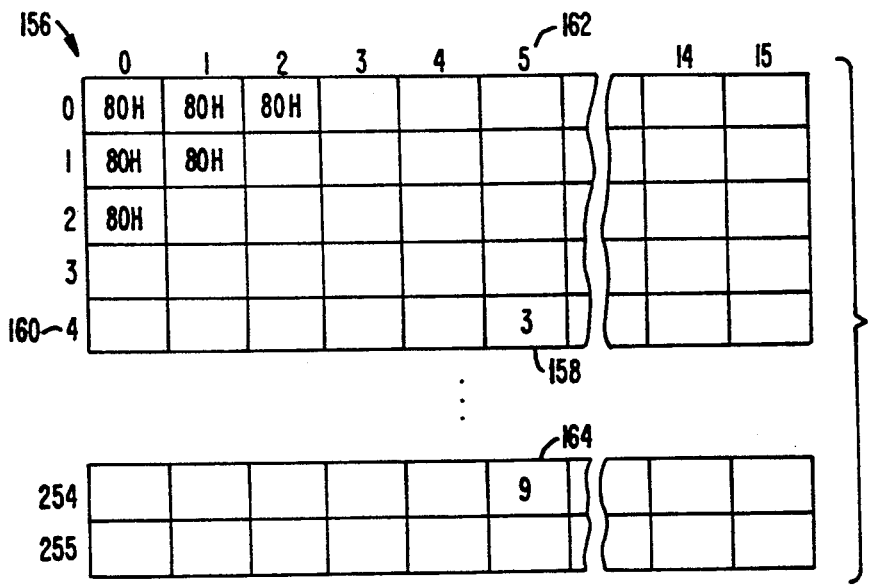
FIG. 8 is a schematic diagram of a Heard From Vector Table.

According to the preferred embodiment, when a node is initially added to or incorporated into the network, a dynamic node assignment method is used, as previously in a standard LocalTalk TM network. However, according to the present invention, the hub circuitry and software maintain, in memory, a table which stores the addresses of active nodes. As seen in FIG. 8, the table 156, which is called the "Heard-From Vector" (HFV) table, contains 256 rows and 16 columns. As will be apparent to those skilled in the art, the physical storage of the table in memory can assume a number of configurations other than a two-dimensional grid. The 256 rows correspond to the 256 possible node identifications or addresses. Typically, one of the 256 possible addresses will be used as the address of the hub circuitry itself. Each of the 16 columns in the vector table corresponds to one of 16 possible Datagram Delivery Protocol (DDP) networks. The present invention can be used in connection with more or fewer DDP networks. The HFV table 156 thus contains 4096 locations, each of which is one byte wide. When the table 156 is first created in the hub circuitry during initialization, each entry is initialized to 80$h$ (where "h" represents a hexadecimal number). This entry is used to indicate that there is no valid connection or node present at the indicated address of the indicated DDP network.

In general, when a newly-activated node uses the dynamic allocation method to obtain an address, the channel 16$a$–16$p$, shown in FIG. 1, used by that node is stored in the table 156 at the row corresponding to the allocated address of the node and the column corresponding to the DDP network on which the node resides.

For clarity of understanding, the process will be described with respect to first and second nodes 18$c$ and 18$i$, which will be allocated specific addresses. It will be understood by those skilled in the art that the illustration will be applicable to other addresses and nodes.

When the first node 18$c$ is activated, it will broadcast an ENQ frame to all nodes on its DDP network, containing a first guessed address. The hub circuitry determines on which DDP netork the first node 18$c$ is located by using the "source" information in the ENQ frame, and by consulting a table of stored values which identify the DDP network. If no other nodes on that DDP network, including the hub circuitry, claims that address, then the node 18$c$ assumes it. At the same time, the hub circuitry and sofware detect the fact that the first node 18$c$ has sent one or more ENQ frames and has not received an ACK frame. Accordingly, the hub circuitry and software are able to record the address which has been allocated to the node 18$c$. For purposes of illustration, if the address contained in the unresponded-to ENQ frame was address 4, and if node 18$c$ resides on DDP network number 5, the hub circuitry and software will record an indication of which channel (in this case, the third channel 16$c$) is used for communication with the first node 18$c$. The indication of the channel where node 18$c$ is to be found is recorded in the table 156 at a cell 158, which resides at the intersection of the row 160, corresponding to the allocated node address (i.e., 4), and the column 162, corresponding to the DDP network on which the node 18$c$ resides (i.e., 5). Similarly, if a second node 18$i$ on DDP network 5 is allocated address 254, the hub circuitry and software will record in the table 156 an indication that the channel 16$i$, which communicates with the second node 18$i$, is the ninth channel, by recording the value of 9 in the corresponding cell 164.

In this way, the hub circuitry contains an indication of which addresses, 0-255, have been allocated and, for each allocated address, which channel on which DDP network can be used to communicate with the node which has been allocated that address.

Although, in the preferred embodiment, an "ENQ" frame is broadcast in order to elicit possible conflicts, it would be possible for the hub circuitry and software to determine, using the table 156, whether there are any conflicts and to formulate and broadcast an appropriate response.

The first node 18c, which is to establish communication with the second node 18i, transmits an RTS frame of the same form as the RTS frame on a previous Local-Talk TM network. However, in the present invention, the RTS frame is transmitted to the hub circuitry, rather than being transmitted over a common bus.

Figure 9:
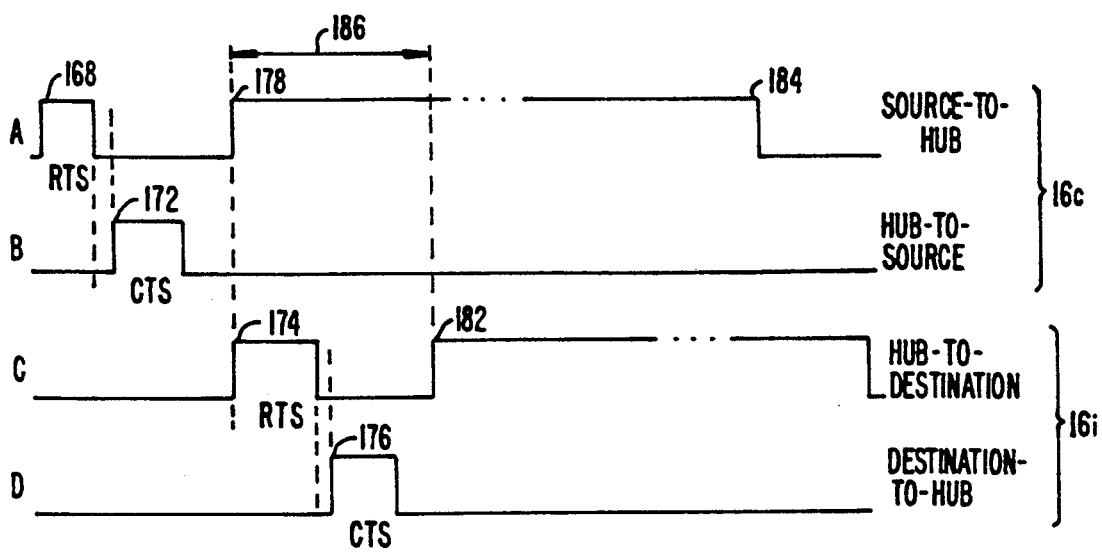
FIG. 9 schematically illustrates the relative timing of source-hub channel and destination-hub channel activity during RTS-CTS protocol according to the present invention.

FIG. 9 depicts activity during RTS/CTS protocol and data transfer. FIGS. 9A and 9B depict activity over the third communication line 16c, which connects the hub circuitry to the source node 18c. FIGS. 9C and 9D depict activity over the ninth communication line 16i, which connects the hub card to the destination node 18i. For clarity of expression, on each channel, activity is separately depicted for communications originating at the hub, and for which one of the nodes is the destination, FIGS. 9B and 9C, and activity for which one of the nodes is the source and for which the hub circuitry is the destination, FIGS. 9A and 9D.

The source node 18c begins by sending an RTS frame 168. The hub card receives the frame and checks the HFV table. The software determines that it has received the communication over the third communication line 16c and over the fifth DDP network. The fifth column of the HFV contains a 3 in the fourth row, indicating that the address corresponding to the third channel is address 4. The hub software also, by examining the destination identification byte 122 of the RTS frame, determines that the intended destination is node address 254. The fifth column of row 254 in the HFV table contains the entry "9," indicating that address 254 can be communicated with over the ninth communication line 16i. Because this cell 164 of the HFV table contains an entry other than "80h," the software has also determined that the destination node has been heard from. When the destination node has been heard from, the software issues an immediate CTS frame 172 to the source node 18c. The hub software issues an RTS frame 174 to the destination node 18i as soon as possible after issuing the CTS frame 172. In one embodiment, as depicted in FIG. 9, the earliest time at which the RTS frame 174 can be issued to the destination node 18i is when data from the source node 18c begins arriving at the hub 178. In another emboiment, the RTS frame 174 can be issued substantially simultaneously with the CTS frame 172.

It is important to note that, according to this scheme, the CTS frame is produced by the hub circuitry and software, not by the destination node. Further, it is important to note that the CTS frame is issued to the source node before the destination node has completely received an RTS frame, and before the destination node has issued its own CTS frame. Because the software does not have to wait to pass on the RTS from the source node to the destination node, does not have to wait for the detination node to respond, and does not have to pass the response from the destination node back to the source node, a savings of time is achieved. This savings of time is, in part, responsible for the ability to use slower and less expensive hardware in the hub circuitry. By employing the HFV table, it is known in advance that the second node has been heard from, i.e., it was connected to the network and was active. Given this state of knowledge, the hub circuitry and software can formulate a "proxy" response, i.e., can concoct a CTS response 172, which is of the same form as the CTS response 176 eventually transmitted by the second node.

After the source node 18c has received the proxy CTS signal 172, it will initiate transmission of a data frame 178. This initiation will occur within the interframe gap following receipt of the proxy CTS frame 172. The data frame 178, which is received from the source node, is stored in the appropriate portion of the shared memory unit 12.

If the channel 16i for the destination node 18i happens to be busy, e.g., because of on-going transmission from a previous communication, the data which is sent to the hub will be stored in the shared memory unit 12 and forwarded when the channel 16i is no longer busy. If the channel 16i is not busy, as depicted in FIG. 9, or as soon as possible after the channel 16i is no longer busy, the hub will issue a RTS frame 174. After the destination node 18i has completed its transmission of the CTS frame 176, the hub circuitry and software will initiate 182 transmission of the data frame from the shared memory unit 12 of the hub circuitry 8 to the destination node 18i. Note that, by using the shared memory scheme, forwarding of the data to the destination node 18i can begin 182 before transmission of the data frame from the source node to the hub has been completed 184.

As can be seen from FIG. 7, in previous methods, the initiation of data transmittal 148 wa simultaneous with its receipt at the destination node. As seen in FIG. 9, in the present invention, there is a latency period 186 between the beginning 178 of transmittal of the data frame from the source node 18c to the hub and the beginning 182 of the transmittal of the data frame from the hub to the destination node 18i. Note that if initiation of the transfer of the data frame to the destination 182 was delayed until after completion 184 of the transmission of the data frame from the source node 18c, a longer period of latency would result which the user would perceive as poor performance. The latency period in such case could be as long as about 21 milliseconds, corresponding to the longest permissible ALAP data frame.

Referring again to FIG. 9, it is noted that it might be possible that the destination node is not active or in communication with the network at the time it is requested. If that fact has been reflected in the HFV table (by a value of 80h in the corresponding cell 164), the hub circuitry and software will not initiate the proxy CTS signal 172, and the source node will be prevented from attempting to transmit data to the nonexistent node. If, however, the HFV table has not been updated to reflect the unavailability of the destination node, the proxy CTS signal 172 will be sent to the source node, and the source node, in response, will begin transmitting data 178. However, because the hub circuitry will never receive the CTS 176 from the destination node, the hub circuitry and software will never initiate transmittal of the data frame 182 to the destination node. It will also update the HFV table to correspond to the non-responsiveness of the destination node, so that any future communication attempts with the destination node will be aborted. Thus, at most, only one data frame will be erroneously transmitted by the source node. Preferably, the source node contains software to recover from such an erroneous transmission in a way that no data will be lost.

When the destination node and the source node reside on different DDP networks, the above-described procedures differ. Nodes communicating on the same hub card or another card which are on different DDP networks no longer use the HFV table. All communication destined for a node on a different DDP network is processed using routing software which resides on the 80186 processor logic 10.

When communication is to be established between a node using LocalTalk TM -type protocols and a node using, e.g., Ethernet TM -or token ring-type protocols, additional processing will be needed. In particular, the hub software will be used to remove the framing, which is peculiar to the AppleTalk TM protocols, while saving data which is important to the transmission, such as destination addresses, translation information, and the like. Next, the processor will encapsulate the data in frame having the format needed for the protocol used by the destination node, employing the previously stored information, such as destination addresses, routing information, data lengths, and the like. The re-encapsulated data can then be transmitted, either over a channel of the same hub card or over the back plane 22, to a second hub card for forwarding to the destination node.

As will be apparent to those skilled in the art, a number of variations and modifications of the invention can be practiced. The single node network configuration can be used for other than communication with LocalTalk TM -typenodes, such as 16-port asynchronous or slow-speed synchronous communications or other types of bus technology. Specifically, the single node network of the present invention can be used, e.g., in connection with Ethernet TM networks, broad-band systems, such as token ring networks, and/or Fiber Data Distributing interfaces (FDDI). An Ethernet TM-network is a base-band system, and uses a collision detection method, as described in IEEE standard 802.3. Token ring systems are systems as described in IEEE standard 802.5. IEEE standards 802.3 and 802.5 are incorporated herein by reference. Processing can be accomplished with a single processor system, rather than a multi-processor system, such as a high-speed reduced instruction set processor. The single node network configuration can be provided on a multitude of cards or in other configurations. An internal bus system can be used for communication in place of a shared memory system. Memory access can be by a priority system, rather than a "round-robin" system.

Although the invention has been described with reference to certain preferred embodiments, other embodiments, modifications, and variations can be used, the invention being defined by the appended claims.

What is claimed is:

1. In a network for digital communication between a plurality of nodes communicating over a transmission medium, said transmission medium having a plurality of links, connected to said nodes said transmission medium having a bandwidth, wherein said nodes share said bandwidth, a device, having a plurality of memory locations, for receiving, storing, and forwarding data communications on said network, said device comprising:

means for storing digital data which is received from a first of said plurality of nodes in a first plurality of memory locations; and means for transmitting said stored data directly onto said transmission medium using said first plurality of memory locations, without writing said data in a second plurality of memory locations in said device;

wherein the effective data transmission rate for each of said plurality of nodes is equal to said bandwidth; and wherein said means for storing and said means for transmitting comprise at least two microprocessors, each of said microprocessors having read access to at least said first plurality of memory locations.

2. Apparatus usable for digitally communicating between at least two data terminals connected by a transmission medium having a plurality of links, comprising:

first means for receiving a first batch of digital data from at least a first of said data terminals sent over a first link;

second means for transmitting data to at least a second of said data terminals over a second link; and third means for providing at least a portion of said first batch of data sent over said first link to said second means for transmitting, at a first effective communication bandwidth, said third means including a plurality of microprocessors, each microprocessor having access to a common memory, wherein said first effective bandwidth is at least about 15 Mbps.

3. Apparatus, as claimed in claim 2, further comprising at least one microprocessor which does not directly communicate with a data terminal, and which communicates with said memory.

4. A method for communicating from a first data terminal which is connected to a baseband network transmission medium to a destination which is a second data terminal, said transmission medium having a plurality of links, connected to said nodes comprising:

providing first means for receiving from said first data terminal a first signal which includes an indication of a destination said first means also being a means for storing;

storing said destination indication received from said first data terminal, in said first means wherein said indication of a destination is effective to indicate at least a second data terminal as a destination;

transmitting a clear-to-send signal from said first means over said transmission medium to said first data terminal;

receiving and storing, in said first means, data sent by said first data terminal in a first plurality of memory locations, following said step of transmitting said clear-to-send signal;

transmitting over said transmission medium a request to send from said first means to said second data terminal;

receiving in said first means a clear-to-send signal over said transmission medium from said second data terminal; and transmitting, from said first means, at least a portion of said stored data over said transmission medium to said second data terminal without storing said portion of said stored data in a second plurality of memory locations.

5. A method for transmitting data from a first network node having data-transmitting means to a second network node having data-receiving means, wherein said first node has means for transmitting a signal of a first request-to-send type and means for receiving a signal of a second clear-to-send type, wherein said first node must receive a signal of said second type before transmitting said data, and wherein said second node has means for transmitting a signal of said second type, the method comprising:

providing hub circuitry having means for communication between a portion of said hub circuitry and said first and second nodes, and having means for receiving, providing, and sending a signal of said first type, means for receiving, producing, and sending signals of said second type, and means for receiving, storing, and forwarding data;

sending a signal of said first type from said first node to said hub circuitry;

using said hub circuitry to produce a signal of said second type and to send said produced signal of said second type to said first node;

using said hub circuitry to send a signal of said first type to said second node;

using said hub circuitry to receive a signal of said second type from said second node;

sending at least a portion of said data from said first node to said hub circuitry.

using said hub circuitry to receive and store said portion of said data send from said first node; and using said hub circuitry to forward t least a part of said data to said second node.

6. A method, as claimed in claim 5, wherein said step of providing hub circuitry comprises providing means for storing at least a first address associated with said first node and a second address associated with said second node.

7. A method, as claimed in claim 6, further comprising using said means for storing addresses to determine whether an address corresponding to said second node has been stored prior to said step of using said hub circuitry to produce a signal of said second type.

8. A method, as claimed in claim 6, wherein said step of using said hub circuitry to produce a signal of said second type, comprises using said means for storing an address corresponding to said second node to embed a signal corresponding to said address in said signal of said second type.

9. A method, as claimed in claim 5, wherein said step of using said hub circuitry to produce a signal of said second type is initiated before said step of using said hub circuitry to receive a signal of said second type.

10. A method, as claimed in claim 5, wherein said step of sending at least a portion of said data from said first node is initiated before completion of said step of using said hub circuitry to receive a signal of said second type from said second node.

11. A method, as claimed in claim 5, wherein said step of using said hub circuitry to forward at least said part of said data is initiated before completion of said step of using said hub circuitry to receive and store said portion of said data sent from said first node.

12. A method for transmitting data among a plurality of nodes, the nodes including at least a first node having data-transmitting means and a second node having data-receiving means, wherein the first node has a first address, wherein the first node has means for transmitting a signal of a first request-to-send type and means for receiving a signal of a second clear-to-send type, wherein the first node must receive a signal of the second type before transmitting the data, wherein the second node has a second address, and wherein the second node has means for transmitting a signal of the second type, the method comprising:

providing first means for digitally communicating between at least said first node and said second node, said first means having a plurality of communications channels, at least a first channel usable for communication with the first node at least a second channel usable for communication with the second node;

providing second means for sending a signal of said first type;

providing third means for receiving, producing, and sending signals of the second type;

providing fourth means for forwarding data;

providing fifth means for storing a plurality of addresses, each stored address being associated with a node;

providing sixth means for indicating which of said plurality of channels is usable for communication with each of the first node and the second node;

sending a signal of the first type from said first node to said first means, wherein said signal contains an indicator signal that at least one of said plurality of nodes is an authorized node which is authorized to receive the data;

using said third means and said fifth means to produce a signal of the second type;

sending said produced signal of the second type to the first node only when at least one of said authorized nodes is associated with an address in said fifth means;

sending a signal of the first type to the second node;

using said third means to receive a signal of the second type from the second node after initiation of the step of sending said produced signal;

initiating the sending of the data from the first node to the fourth means before the completion of the step of using the third means to receive a signal of the second type; and forwarding at least a portion of the data to the second node before all of the data has been sent from the first node to the fourth means.

13. A method, as claimed in claim 12, further comprising positioning circuitry which includes said first, second, third, fourth, and sixth means onto a single card.

14. A method, as claimed in claim 12, wherein said steps of providing said third means and said fourth means includes providing at least a first microprocessor and providing a memory means, said first microprocessor being coupled to said memory means.

15. A method, as claimed in claim 12, wherein said step of providing said fifth means includes providing memory storage means.

* * * * *